United States Patent
Udd

(10) Patent No.: US 7,905,392 B2
(45) Date of Patent: Mar. 15, 2011

(54) CODE COLLECTION IN MOBILE DEVICE

(75) Inventor: Sture Udd, Vaasa (FI)

(73) Assignee: UPC Konsultointi Oy, Vaasa (FI)

( * ) Notice: Subject to any disclaimer, the term of this patent is extended or adjusted under 35 U.S.C. 154(b) by 0 days.

(21) Appl. No.: 12/677,481

(22) PCT Filed: Jul. 21, 2009

(86) PCT No.: PCT/FI2009/050636
§ 371 (c)(1),
(2), (4) Date: Mar. 10, 2010

(87) PCT Pub. No.: WO2010/012865
PCT Pub. Date: Feb. 4, 2010

(65) Prior Publication Data
US 2010/0243726 A1    Sep. 30, 2010

(30) Foreign Application Priority Data
Jul. 30, 2008   (FI) .................................. 20085751

(51) Int. Cl.
*G06F 17/00* (2006.01)
*G06K 7/10* (2006.01)
*G06K 7/14* (2006.01)
*G06K 7/00* (2006.01)
*G06K 19/00* (2006.01)

(52) U.S. Cl. .................... 235/375; 235/462.01; 235/435; 235/454; 235/487

(58) Field of Classification Search ............. 235/462.01, 235/454, 435, 487, 375
See application file for complete search history.

(56) References Cited

U.S. PATENT DOCUMENTS

| | | | | |
|---|---|---|---|---|
| 4,272,674 | A * | 6/1981 | Takahashi et al. | 235/69 |
| 4,419,572 | A * | 12/1983 | Takahashi et al. | 235/69 |
| 5,794,213 | A * | 8/1998 | Markman | 705/23 |
| 6,032,865 | A * | 3/2000 | Itoh et al. | 235/462.25 |
| 6,321,986 | B1 * | 11/2001 | Ackley | 235/462.01 |
| 6,354,499 | B2 * | 3/2002 | Matsueda et al. | 235/435 |
| 2001/0030232 | A1 * | 10/2001 | Piatek | 235/375 |
| 2002/0036232 | A1 * | 3/2002 | Massod | 235/385 |
| 2002/0113127 | A1 * | 8/2002 | Takeuchi et al. | 235/462.25 |

(Continued)

FOREIGN PATENT DOCUMENTS

JP    2003-216779 A    7/2003

(Continued)

OTHER PUBLICATIONS

Finnish Office Action and Translation of May 20, 2009, Finnish Patent Application No. 20085751.

*Primary Examiner* — Daniel Walsh
(74) *Attorney, Agent, or Firm* — Birch, Stewart, Kolasch & Birch, LLP

(57) ABSTRACT

An apparatus comprising means for processing data representative of an optically readable code, means for detecting, from the data representative of the optically readable code, a symbol indicating that the code is a member of a set of codes including at least two optically readable codes, means for collecting, from the data representative of the optically readable code, one or more collection symbols, and means for assessing, on the basis of the collection symbols collected from at least two optically readable codes, if a predetermined collection criterion for finishing the collections is fulfilled.

30 Claims, 3 Drawing Sheets

U.S. PATENT DOCUMENTS

| | | | |
|---|---|---|---|
| 2003/0213844 A1* | 11/2003 | Yoshida et al. | 235/383 |
| 2004/0074966 A1* | 4/2004 | Holzer | 235/385 |
| 2004/0129781 A1* | 7/2004 | Kreiner et al. | 235/385 |
| 2004/0169071 A1* | 9/2004 | Burgan et al. | 235/375 |
| 2005/0150944 A1* | 7/2005 | Melick et al. | 235/375 |
| 2006/0076418 A1* | 4/2006 | Ostertun et al. | 235/492 |
| 2007/0040029 A1* | 2/2007 | Mazowiesky | 235/440 |
| 2008/0149719 A1 | 6/2008 | Shen et al. | |
| 2008/0240595 A1 | 10/2008 | Le Hanne | |
| 2008/0257951 A1* | 10/2008 | Mayer et al. | 235/375 |
| 2009/0294539 A1* | 12/2009 | Kim | 235/462.01 |

FOREIGN PATENT DOCUMENTS

| | | |
|---|---|---|
| KR | 2002-0074844 A | 10/2002 |
| WO | WO 02/17164 A2 | 2/2002 |
| WO | WO 03/100707 A1 | 12/2003 |

* cited by examiner

CODE COLLECTION IN MOBILE DEVICE

FIELD

The invention relates to a code management functionality in a mobile device. The invention particularly relates to collecting of optically readable codes.

BACKGROUND

Mobile stations, such as mobile phones, may interact with each other and other network devices via a mobile communication network. The communication of the mobile stations via the mobile communication network is so characteristic of the mobile stations that this approach continues to be dominant despite some evident deficiencies.

The availability of a communication network based service may be dependent on several factors, such as the operation of the communication network serving the mobile station, the operation of a data communication network such as the Internet, or the operation of a server operating in the communication network and providing services to the mobile station.

SUMMARY

In an aspect, there is provided an apparatus comprising means for processing data representative of an optically readable code. The apparatus further comprises means for detecting, from the data representative of the optically readable code, a symbol indicating that the code is a member of a set of codes including at least two optically readable codes, means for collecting, from the data representative of the optically readable code, one or more collection symbols, and means for assessing, on the basis of the collection symbols collected from at least two optically readable codes, if a predetermined collection criterion for finishing the collections is fulfilled.

In another aspect, there is provided a method comprising processing data representative of an optically readable code, detecting, from the data representative of the optically readable code, a symbol indicating that the code is a member of a set of codes including at least two optically readable codes, collecting, from the data representative of the optically readable code, one or more collection symbols, and assessing, on the basis of the collection symbols collected from at least two optically readable codes, if a predetermined collection criterion for finishing the collection of collection symbols is fulfilled.

DRAWINGS

Figure 1:
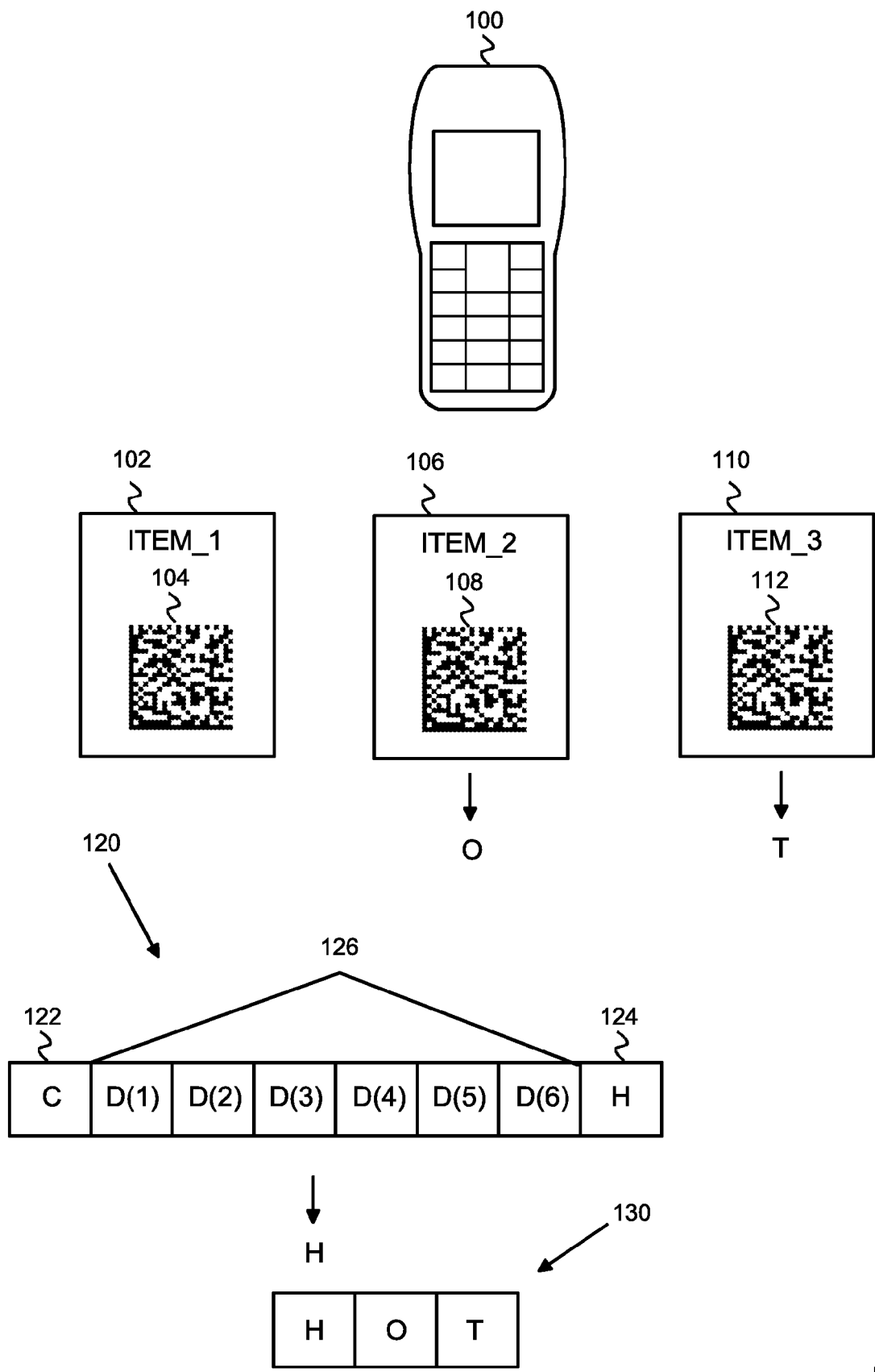
Figure 2:
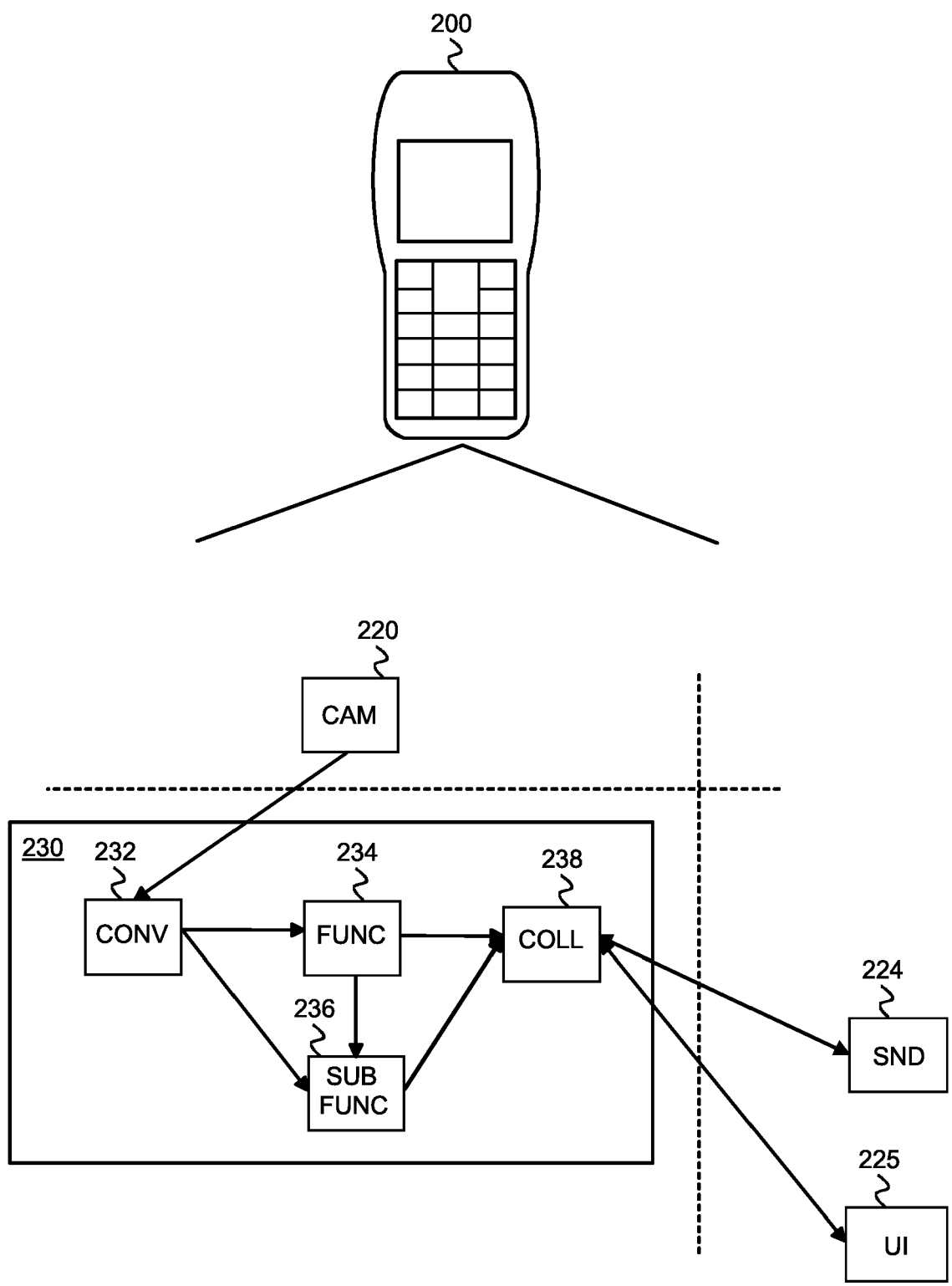
Figure 3:
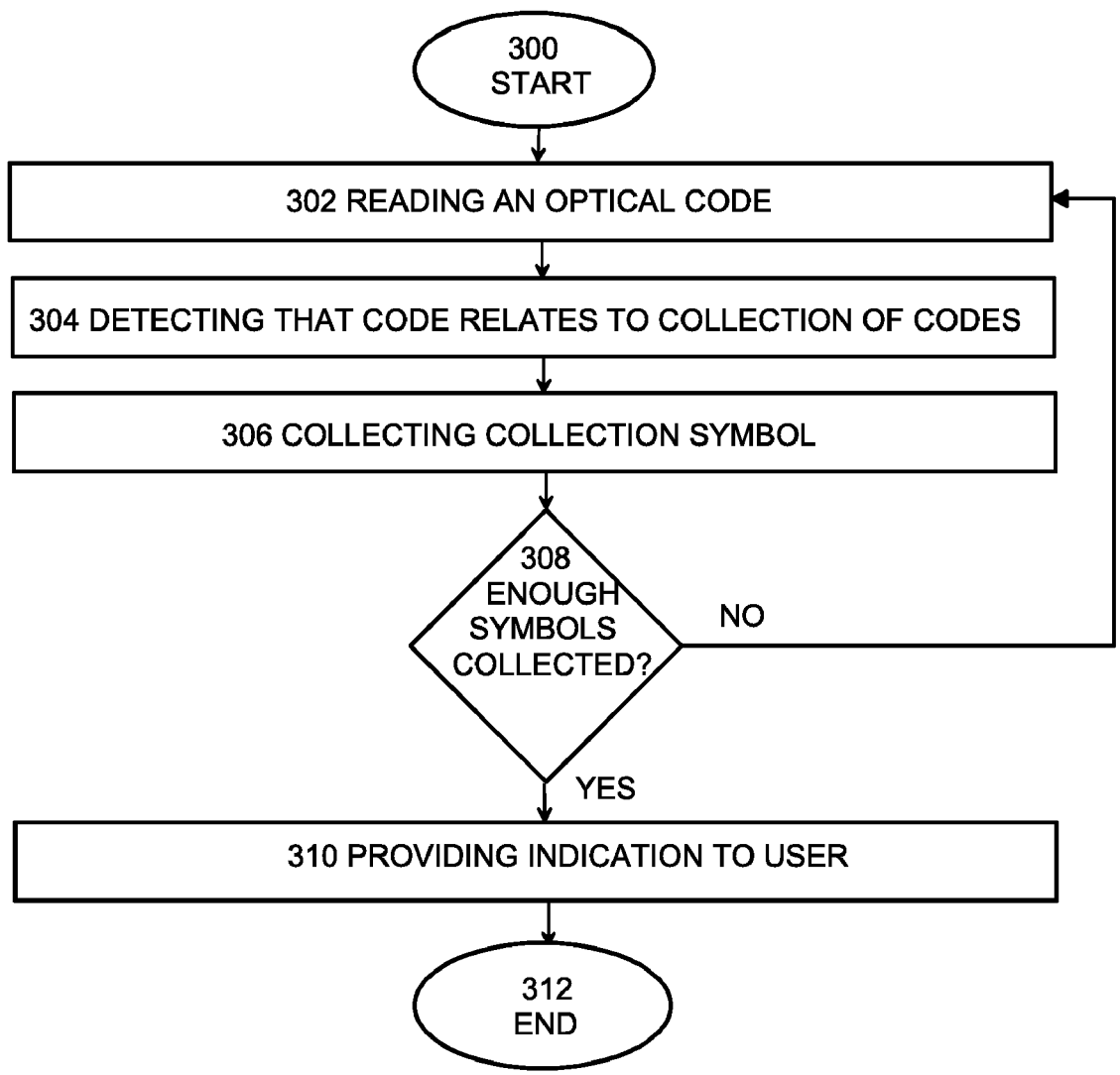

In the following the invention will be described in greater detail by means of preferred embodiments with reference to the accompanying drawings, in which FIG. 1 shows an embodiment of an arrangement;
FIG. 2 shows an embodiment of an apparatus; and
FIG. 3 shows an embodiment of a method.

DESCRIPTION OF SOME EMBODIMENTS

FIG. 1 shows an embodiment of an arrangement. The embodiment shows a mobile station 100. The figure also shows three items 102, 106 and 110. The items may be any items, such as newspapers, bottles or containers, for instance. Each item 102, 106, 110 has an optically readable code 104, 108 and 112, respectively, attached to or printed on the item. The optically readable code may be a two-dimensional data matrix or a so-called smart code.

The mobile station includes a functionality for reading or scanning the codes 104, 108, 112. The functionality may include a built-in camera for scanning and taking a photo of the code. The functionality may further include a software functionality for interpreting the information in the photo of the code taken with the camera. The mobile station may also be capable of providing operations on the basis of the interpreted information.

FIG. 1 also shows a data structure 120 including the information extracted from the optically readable code 104. The software functionality in the mobile phone may thus convert the code 104 to a set of symbols. The set of symbols may be a string of characters, for instance. In the example of FIG. 1, the data structure includes eight character positions and each position may contain one character.

The converted information contents in the data structure 120 may include a symbol "C" 122 indicating that the code is a member of a set of codes, that is, the type of the code is a collection code. A set of collection codes includes at least two codes and a predetermined number of the codes are supposed to be collected so as to finish the collecting of the codes. In FIG. 1, the set of collection codes is formed by the codes 104, 108 and 112. It may be assumed that all the codes 104, 108 and 112 need to be collected.

The symbol referring to a collection code may similarly be positioned in a predetermined position of the data structure. For instance, the mobile station may know to look for the indicator of the collection code from the first character position 122 in the data structure 120. Thus, upon interpreting the data of the code 104, the mobile station may find the character "C" in the first position, whereby the mobile station becomes aware that the code relates to the code collection functionality.

The data structure 120 may include one or more collection symbols 124. The collection symbols may similarly be placed into predetermined positions in the set of characters extracted from the data matrix code 104. For instance, when the mobile station has identified the indicator 122 of the collection mode, the mobile station may know that a collection symbol is located in the eighth character position of the data structure 120, for instance. The rest of the character positions 126 may each include one character each for other possible purposes in the use of the code data.

Thus, the collection symbol of the data structure 120 is an ASCII character "H". Correspondingly, the optically readable code 108 may carry the character "O", and the code 112 may carry the character "T".

FIG. 1 further shows a second data structure 130 including three character positions. The second data structure is for collecting the collection symbols of such codes that have been read by the mobile station 100. In the example of FIG. 1, all the collection symbols "H", "O" and "T" have been collected and the word "HOT" is established.

Whenever the second data structure is updated, a check may be carried out whether all the collection symbols have been collected, and a corresponding indication may be provided. For instance, if the letter "O" is collected first, it may be indicated that "O" was collected but "H" and "T" are still missing. The indication may be given by providing a sound and/or visual indication on the mobile phone. Similarly, if "T" is collected in the second round, the device may give an indication that "T" was collected, "O" and "T" have been collected, and "H" is still missing. In the last round, when "H" is collected, the device may indicate that "H" was collected and that the word "HOT" is now complete and the collection of the codes may be finished. Alternatively, the letters of the word "HOT" may need to be collected in a specific order.

Thus, in the first round, only the letter "H" would be accepted and the collection of "T" would be considered as invalid.

The symbols 122 to 126 in the data structure are not necessarily in a directly decodable format. That is, instead of the letter "C", the first character position 122 may hold a number "9", for instance. The program in the mobile station may read the number "9" from the first character position 122 and know that it maps to a letter "C", for instance. An extra mapping functionality may be provided to enhance the security of the codes.

Although FIG. 1 shows a collection of character letters, the collection may alternatively be a collection of a numeric sum, for instance. That is, the collection symbol 124 may include an alphanumerical number. Thus, instead of collecting letters to a data structure 130, a sum of numbers may be collected. Thus sum may be the number "17", for instance, and three codes each including one of the numbers "2", "7" and "8" would need to be collected to obtain the collection sum "17". During the collection, each individual number may also be checked such that the sum cannot be obtained by collecting any other combination of numbers giving the sum "17".

The symbol collection procedure may be applied when checking the components of a delivery, for instance. This exemplary application is explained in the following.

We may assume that an installation engineer working for a manufacturing company is going to install a new machine in a distant destination location where the machine is being shipped. In the company in the original location, the engineer may load an application into his mobile phone, which application includes data of the collection codes. The data may include one or more of the following: the individual collection letters/numbers, the word to be collected and the sum of the numbers to be collected.

Additionally, the information may include the location where the collection has to be carried out such that only the collection of symbols carried out in the predetermined destination is considered as an acceptable collection. The location of the mobile station carrying out the collection may be determined by using a mobile network or GPS (global positioning system) locating functionality.

Furthermore, the data loaded into the program may include a subscriber identity, such as a SIM (Subscriber Identity Module) identity, and/or a device identity, such as an IMEI (International Mobile Equipment Identity) code of the mobile station. The SIM code may be applied such that the collection is only allowed when a predetermined SIM is used in the mobile station. The IMEI code may be used such that the collection may only be carried out when the application is loaded into a predetermined mobile station.

In this example, we may consider that the machine is transported as parts, and each part is equipped with an optically readable code, each including one of the collection symbols. The engineer should then check, in the destination, that all parts of the machine have reached the destination. The success of the transportation may be checked by reading the codes and collecting the symbols on the different parts of the machine. When the engineer has finished this task, the device may give a corresponding indication, either that all the parts are available or that some parts are missing.

The mobile station may also form a checking code, which may use, in addition to the machine information, date, location, SIM and/or IMEI information. In this way, it may be confirmed who (associated with the SIM/IMEI) has carried out the collection, where and when. The checking code may be stored in the mobile station or may be sent to the originating location, for instance.

In addition to the indicators 122 and 124 in the data structure, further parameters specifying the collection may be provided. For instance, the symbol marked as "D(1)" in the data structure 120 may indicate the type of collection. A parameter value "1", for instance, may be interpreted such that all the codes in the set of codes need to be collected. A parameter value "2", for instance, may be interpreted such that three out of five codes need to be collected.

There may be several simultaneously ongoing collections on the mobile station. The additional parameters in the code may also be used for this purpose. The character position "D(2)" in FIG. 1 may, for instance, include an identifier of the collection to which the code relates.

Although FIG. 1 refers to a data matrix code, any other optically readable code may be applied for the same purpose. Instead of a mobile station, the device reading the code may be any device capable of reading an optically readable code.

FIG. 2 shows an embodiment of a device 200, which may be a mobile station, for instance. The mobile station 200 includes reading means 220 for reading/scanning an optically readable code. The reading means may include a built-in camera.

The mobile station may also include a unit 224 for giving a sound indication. An application 230 may send a request over the interface shown by the dashed line to provide a sound indication. The sound may then be given via a loudspeaker of the mobile station 200.

The device may also include a user interface 225, which may include a keyboard, a touch screen, and a display, for instance.

An application 230 may be loaded into the mobile station. The application may be such that it does not belong to the standard functionality of the mobile phone. Thus, corresponding applications may be loaded into the mobile station whenever needed. The application may thus be implemented by means of software and may be loadable into a processor of the mobile station.

The application 230 may include a converter 232 for converting a data matrix code read by the camera 220 to a set of characters. The set of characters may include a string of ASCII characters, for instance. The application may further include a function identifier 234. The function identifier may, for instance, search for the character "C" indicating that the code relates to a collection mode for collecting optically readable codes. On the device, provided by the application, there may be a collection mode. To enter this collection mode, in a first embodiment, a user of the mobile station may indicate this via the user interface 225. In another embodiment, the mere reading of the code triggers the collection mode in the device. That is, upon finding the letter "C" in the first position of the extracted string of characters, the application 230 for handling the collection mode is started.

The application 230 may also include a sub-function identifier 236. The sub-function identifier may identify, from the set of characters, further parameters needed to implement the collection functionality. One of these parameters may be the type of collection. Another parameter may be time duration allowed for the collection. A time limit of one day, for instance, may be provided in which a collection needs to be carried out.

The application also includes a collection unit 238 for coordinating the collection mode. The collection unit may take as an input from the unit 234 an indication that a collection indicator has successfully been found in the code. The sub-function unit 236 may provide the collection unit 238 with possible further parameters to implement the collection.

When a code has been read, the collection unit 238 may add the collected symbol to a set of collected symbols. The unit may also carry out comparisons, if a predetermined number of symbols have been collected. By using a display and sound devices of the mobile station, the collection unit may give indications of how the collection is proceeding. As an example, the indication may be that four out of five codes have been collected and there are two more hours left to collect the last code. The indication may further indicate that the letter "P" needs to be found.

FIG. 3 shows an embodiment of a method.

In 302, an optical code is read by using a mobile device. The device may first check that the collection is carried out in an allowable location. For instance, when collecting symbols from drinking bottles, the collection may be prevented inside a store and may only be allowed outside the store. Additionally, it may be checked that the SIM card of the phone and/or the IMEI code of the phone belong to the set of allowable identities for collecting the symbols.

In 304, the device decodes the optical code and provides one or more symbols as an output of the functionality. The device may detect, by finding a suitable symbol from the decoded data, that the code relates to the collection functionality. Possible further parameters in the code and needed to implement the collection may also be detected from the code.

In 306, one or more collection symbols are detected from the code. The collection symbols may be letters or numbers, for instance. The symbols may even be visual symbols but in practice those are also processed in digital form in the device and are thus convertible to letters/numbers. The collection symbols may need to be mapped. That is, if a word "HOT" is the word to be collected, the symbols read from the codes may be "AXZ", for instance, and may be mapped to "HOT" in the program of the mobile station.

In 308, the collected one or more collection symbols are included in the set of collected collection symbols from the already read optically readable codes that have already been read. It may be assessed by carrying out a check whether a predetermined number of symbols have been collected. Alternatively, as a predetermined collection condition for finishing the collection, it may be checked if the sum of the collected collection symbols equals or exceeds a predetermined threshold value. Besides the sum, other calculation operations may also be carried out with the symbols. Such operations include subtracting, multiplying and dividing, for instance.

If the collection condition for finishing the collection has not been fulfilled, the collection may continue from 302. If the collection may be finished, an indication may be provided for the user as a visual and/or sound indication, for instance. Although not shown in FIG. 3, the non-completeness of the collection may also be indicated to the user.

The embodiments provide an advantage that the collection functionality may be implemented locally within a mobile station and is independent of the availability of external networks or server computers, for instance.

The disclosed functionality in various embodiments may be implemented by way of a computer program product encoding a computer program of instructions for executing a computer process of the above-described method. The computer program product may be implemented on a computer program distribution medium. The computer program distribution medium may be any of the known ways of distributing software, such as a computer readable medium, a program storage medium, a record medium, a computer readable memory, a computer readable software distribution package, a computer readable signal, a computer readable telecommunication signal, and a computer readable compressed software package.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus comprising:
a processor configured to process data representative of an optically readable code;
a detector configured to detect, from the data representative of the optically readable code, a symbol indicating that the code is a member of a set of codes including at least two optically readable codes;
a collecting device configured to collect, from the data representative of the optically readable code, one or more collection symbols, wherein the collecting device is configured to collect, as the collection symbols from the at least two optically readable codes, alphanumerical letters or alphanumerical numbers, and to form a predetermined collection word from the alphanumerical letters or a predetermined collection sum from the alphanumerical numbers; and
an assessing device configured to assess, on the basis of the collection symbols collected from at least two optically readable codes, if a predetermined collection criterion for completing the collections is fulfilled, by determining whether the collected alphanumerical letters form the collection word to be collected or whether the collected alphanumerical numbers, when summed up, form the collection sum to be collected.

2. The apparatus of claim 1, further comprising:
a converting device configured to convert the optically readable code into a string of symbols; and
a detector configured to detect, from a predetermined position in the string of symbols, a symbol indicating that the code is a member of a set of codes including at least two optically readable codes.

3. The apparatus of claim 1, further comprising:
a providing device configured to provide an indication of one or more collection symbols which have been collected and which collection symbols are still to be collected.

4. The apparatus of claim 1, further comprising:
an applying device configured to apply a collection mode, in which the detector, the collecting device, and the first assessing device are activated.

5. An apparatus comprising:
a processor configured to process data representative of an optically readable code;
a detector configured to detect, from the data representative of the optically readable code, a symbol indicating that the code is a member of a set of codes including at least two optically readable codes;
a collecting device configured to collect, from the data representative of the optically readable code, one or more collection symbols;
an assessing device configured to assess, on the basis of the collection symbols collected from at least two optically readable codes, if a predetermined collection criterion for completing the collections is fulfilled;
a determining device configured to determine a location of a mobile station;
an accepting device configured to accept the one or more collection symbols as valid collection symbols only if the location of the mobile station fulfils a predetermined criterion for allowing the collection device to collect the one or more collection symbols.

6. The apparatus of claim 5, further comprising:
a converting device configured to convert the optically readable code into a string of symbols; and a detector configured to detect, from a predetermined position in the string of symbols, a symbol indicating that the code is a member of a set of codes including at least two optically readable codes.

7. The apparatus of claim 5, further comprising:
a providing device configured to provide an indication of one or more collection symbols which have been collected and which collection symbols are still to be collected.

8. The apparatus of claim 5, further comprising:
an applying device configured to apply a collection mode, in which the detector, the collecting device, and the first assessing device are activated.

9. An apparatus comprising:
a processor configured to process data representative of an optically readable code;
a detector configured to detect, from the data representative of the optically readable code, a symbol indicating that the code is a member of a set of codes including at least two optically readable codes;
a collecting device configured to collect, from the data representative of the optically readable code, one or more collection symbols;
an assessing device configured to assess, on the basis of the collection symbols collected from at least two optically readable codes, if a predetermined collection criterion for completing the collections is fulfilled;
a checking device configured to check one or more of a subscriber identity and a device identity; and
an accepting device configured to accept the one or more collection symbols as valid collection symbols only if the one or more of the subscriber identity and the device identity fulfill a predetermined criterion for allowing the collection device to collect the one or more collection symbols.

10. The apparatus of claim 9, further comprising:
a converting device configured to convert the optically readable code into a string of symbols; and
a detector configured to detect, from a predetermined position in the string of symbols, a symbol indicating that the code is a member of a set of codes including at least two optically readable codes.

11. The apparatus of claim 9, further comprising:
a providing device configured to provide an indication of one or more collection symbols which have been collected and which collection symbols are still to be collected.

12. The apparatus of claim 9, further comprising:
an applying device configured to apply a collection mode, in which the detector, the collecting device, and the first assessing device are activated.

13. A method comprising the steps of:
processing data representative of an optically readable code;
detecting, from the data representative of the optically readable code, a symbol indicating that the code is a member of a set of codes including at least two optically readable codes;
collecting, from the data representative of the optically readable code, one or more collection symbols; and
assessing, on the basis of the collection symbols collected from at least two optically readable codes, if a predetermined collection criterion for completing the collection of collection symbols is fulfilled, by determining whether the collection symbols comprise alphanumerical letters that form a predetermined collection word or alphanumerical numbers that when summed up, form a predetermined collection sum; and
configuring, as the collection symbols, alphanumerical letters forming a collection word or alphanumerical numbers forming a collection sum,
wherein the steps of processing, detecting, collecting, assessing and configuring are performed by an electronic device.

14. The method of claim 13, further comprising:
converting the optically readable code into a string of symbols; and
detecting, from a predetermined position in the string of symbols, a symbol indicating that the code is a member of a set of codes including at least two optically readable codes.

15. The method of claim 13, further comprising:
providing an indication of one or more of which collection symbols have been collected and which collection symbols are still to be collected.

16. A method comprising the steps of:
processing data representative of an optically readable code;
detecting, from the data representative of the optically readable code, a symbol indicating that the code is a member of a set of codes including at least two optically readable codes;
collecting, from the data representative of the optically readable code, one or more collection symbols;
assessing, on the basis of the collection symbols collected from at least two optically readable codes, if a predetermined collection criterion for completing the collection of collection symbols is fulfilled;
determining the location of the mobile station; and
accepting the one or more collection symbols as valid collection symbols only if the location of the mobile station fulfils a predetermined criterion for allowing the collecting of the one or more collection symbols;
wherein the steps of processing, detecting, collecting, assessing, determining and accepting are performed by an electronic device.

17. The method of claim 16, further comprising:
converting the optically readable code into a string of symbols; and
detecting, from a predetermined position in the string of symbols, a symbol indicating that the code is a member of a set of codes including at least two optically readable codes.

18. The method of claim 16, further comprising:
providing an indication of one or more of which collection symbols have been collected and which collection symbols are still to be collected.

19. A method comprising the steps of:
processing data representative of an optically readable code;
detecting, from the data representative of the optically readable code, a symbol indicating that the code is a member of a set of codes including at least two optically readable codes;
collecting, from the data representative of the optically readable code, one or more collection symbols;
assessing, on the basis of the collection symbols collected from at least two optically readable codes, if a predetermined collection criterion for completing the collection of collection symbols is fulfilled;
checking one or more of a subscriber identity and a device identity; and accepting the one or more collection symbols as valid collection symbols only if the one or more of the subscriber identity and the device identity fulfill a predetermined criterion for allowing the collecting of the one more collection symbols, wherein the steps of processing, detecting, collecting, assessing, checking and accepting are performed by an electronic device.

20. The method of claim 19, further comprising:

converting the optically readable code into a string of symbols; and detecting, from a predetermined position in the string of symbols, a symbol indicating that the code is a member of a set of codes including at least two optically readable codes.

21. The method of claim 19, further comprising:

providing an indication of one or more of which collection symbols have been collected and which collection symbols are still to be collected.

22. A non-transitory computer-readable medium including a computer program product stored thereon, the computer program product comprising computer executable instructions and, when executed by an electronic device, performing the following steps:

processing data representative of an optically readable code, detecting, from the data representative of the optically readable code, a symbol indicating that the code is a member of a set of codes including at least two optically readable codes;

collecting, from the data representative of the optically readable code, one or more collection symbols; and assessing, on the basis of the collection symbols collected from at least two optically readable codes, if a predetermined collection criterion for completing the collection of collection symbols is fulfilled, by determining whether the collection symbols comprise alphanumerical letters that form a predetermined collection word or whether the collection symbols comprise alphanumerical numbers, that when summed up, form a predetermined collection sum; and configuring, as the collection symbols, alphanumerical letters forming a collection word or alphanumerical numbers forming a collection sum.

23. The non-transitory computer-readable medium of claim 22, wherein the computer program product further comprises computer executable instructions for:

converting the optically readable code into a string of symbols; and detecting, from a predetermined position in the string of symbols, a symbol indicating that the code is a member of a set of codes including at least two optically readable codes.

24. The non-transitory computer-readable medium of claim 22, wherein the computer program product further comprises computer executable instructions for:

providing an indication of one or more of which collection symbols have been collected and which collection symbols are still to be collected.

25. The non-transitory computer-readable medium of claim 22, wherein the computer program product further comprises computer executable instructions for:

converting the optically readable code into a string of symbols; and detecting, from a predetermined position in the string of symbols, a symbol indicating that the code is a member of a set of codes including at least two optically readable codes.

26. The non-transitory computer-readable medium of claim 22, wherein the computer program product further comprises computer executable instructions for:

providing an indication of one or more of which collection symbols have been collected and which collection symbols are still to be collected.

27. The non-transitory computer-readable medium of claim 22, wherein the computer program product further comprises computer executable instructions for:

converting the optically readable code into a string of symbols; and detecting, from a predetermined position in the string of symbols, a symbol indicating that the code is a member of a set of codes including at least two optically readable codes.

28. The non-transitory computer-readable medium of claim 22, wherein the computer program product further comprises computer executable instructions for:

providing an indication of one or more of which collection symbols have been collected and which collection symbols are still to be collected.

29. A non-transitory computer-readable medium including a computer program product stored thereon, the computer program product comprising computer executable instructions and, when executed by an electronic device, performing the following steps:

processing data representative of an optically readable code, detecting, from the data representative of the optically readable code, a symbol indicating that the code is a member of a set of codes including at least two optically readable codes;

collecting, from the data representative of the optically readable code, one or more collection symbols;

assessing, on the basis of the collection symbols collected from at least two optically readable codes, if a predetermined collection criterion for completing the collection of collection symbols is fulfilled;

determining the location of the mobile station; and accepting the one or more collection symbols as valid collection symbols only if the location of the mobile station fulfils a predetermined criterion for allowing the collecting of the one or more collection symbols.

30. A non-transitory computer-readable medium including a computer program product stored thereon, the computer program product comprising computer executable instructions and, when executed by an electronic device, performing the following steps:

processing data representative of an optically readable code, detecting, from the data representative of the optically readable code, a symbol indicating that the code is a member of a set of codes including at least two optically readable codes;

collecting, from the data representative of the optically readable code, one or more collection symbols;

assessing, on the basis of the collection symbols collected from at least two optically readable codes, if a predetermined collection criterion for completing the collection of collection symbols is fulfilled;

checking one or more of a subscriber identity and a device identity; and accepting the one or more collection symbols as valid collection symbols only if the one or more of the subscriber identity and the device identity fulfill a predetermined criterion for allowing the collecting of the one or more collection symbols.

* * * * *